Figure 1:
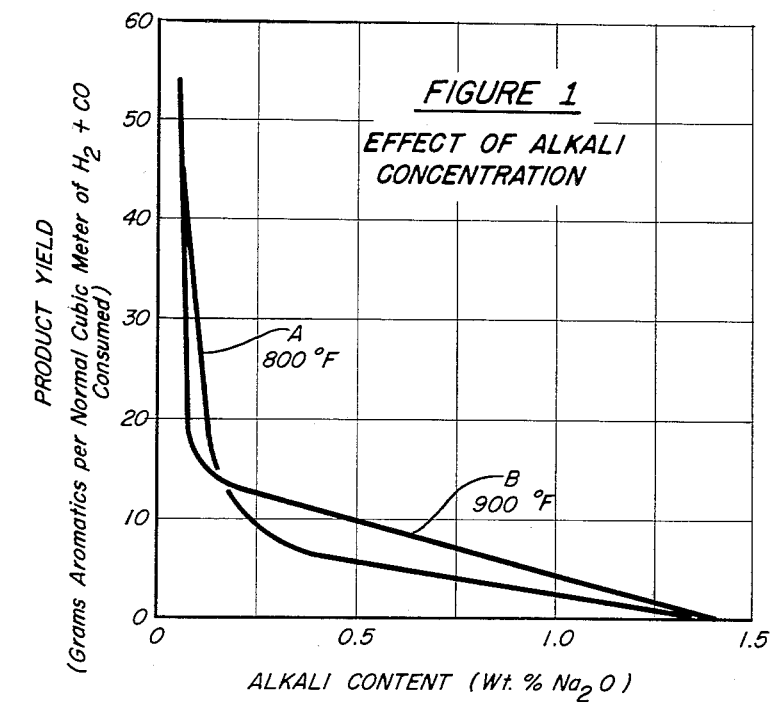

Dec. 13, 1955  H. S. SEELIG ET AL  2,727,055
CATALYTIC SYNTHESIS OF AROMATIC HYDROCARBONS FORM CO AND $H_2$
Filed Dec. 13, 1952

EFFECT OF ALKALI CONCENTRATION

EFFECT OF TEMPERATURE

INVENTORS:
Herman S. Seelig
Herman I. Weck
BY
ATTORNEY

United States Patent Office 2,727,055
Patented Dec. 13, 1955

2,727,055

CATALYTIC SYNTHESIS OF AROMATIC HYDROCARBONS FROM CO AND $H_2$

Herman S. Seelig, Valparaiso, and Herman I. Weck, Hammond, Ind., assignors to Standard Oil Company, Chicago, Ill., a corporation of Indiana Application December 13, 1952, Serial No. 325,778

5 Claims. (Cl. 260—449)

This invention relates to a process of preparing aromatic hydrocarbons from carbon monoxide and hydrogen, and has particular reference to the catalytic synthesis of aromatic hydrocarbons from the said gases.

The synthesis of hydrocarbons, particularly aliphatic and oxygenated compounds, from carbon monoxide and hydrogen over Fischer-Tropsch or iron-type catalysts is well known. The content of aromatic hydrocarbons in such hydrocarbon synthesis products is always low and often zero. A primary object of the present invention is the provision of an improved catalytic process for the synthesis of aromatic hydrocarbons from carbon monoxide and hydrogen. Another object of the invention is the provision of an improved catalytic process for the synthesis from carbon monoxide and hydrogen of an organic liquid product that is substantially entirely aromatic. Yet another object of the invention is the provision of a process for the catalytic synthesis from carbon monoxide and hydrogen of a liquid product consisting predominantly of methyl-substituted mononuclear aromatic hydrocarbons. Other objects of the present invention will be apparent from the following specification and claims.

Briefly stated, the present invention comprises reacting hydrogen and carbon monoxide (in a mol ratio between about 1:4 and 4:1 and preferably about 1:1), at a temperature between about 750° and 950° F., and preferably between 800° and 925° F., and a pressure between about 30 and 600 atmospheres, or higher, but less than 2,000 atmospheres, in the presence of an alumina catalyst having an alkali content of less than 0.3% alkali-metal oxide, based on the weight of alumina, and preferably of less than 0.2 weight precent. The relative amount of catalyst to reactants as measured by the space velocity, which is the number of volumes of gas per volume of catalyst per hour, can be between about 100 and 1500 for fixed bed reactors and is preferably between about 500 and 1000; for fluidized bed operation using recycle, total-feed space velocities as high as 10,000 may be employed.

The preparation of alumina catalysts, which have wide application to hydrocarbon conversion processes, has in large measure involved processes which result in the inclusion with the alumina of varying percentages of alkali-metal impurities. For example, when alumina is prepared by its precipitation from an aqueous solution of sodium aluminate with carbon dioxide, repeated washings with water of the resulting alumina gel does not reduce the sodium oxide content to less than 1.4 weight percent. Alumina catalysts having an alkali content of 1.4 weight percent or even of 1 percent effect, under the above synthesis conditions, substantially no production of aromatic hydrocarbons.

We have found that when a substantially pure alumina catalyst (i. e., one having less than about 0.3 weight percent alkali-metal oxide) is employed in our process, a predominant amount of the liquid product so-obtained is aromatic. If the alkali-metal oxide content is less than about 0.2 to 0.25 percent, substantially all of the liquid product is aromatic. The pure alumina employed in our process is usually at least 99% pure. Trace quantities of, for example, compounds of manganese, molybdenum, tin, tungsten, iron and copper may be present provided the total weight of such compounds does not exceed about 1%. Zinc oxide may be present in somewhat larger quantities.

Alumina catalysts that have been used in the past for hydrocarbon synthesis (Pichler et al., The Isosynthesis, Bureau of Mines Bulletin 488) have contained over 1.0 percent alkali-metal oxide, and the products of such a synthesis have consisted of methane and carbon and of small quantities of other light paraffins. We have found, however, that if alumina catalysts are employed at temperatures of between about 750° and 950° F., and if these catalysts contain less than about 0.3% alkali-metal oxide, an aromatic product is obtained.

The conversion of carbon monoxide to liquid hydrocarbons at pressures below about 250 p. s. i. g. is low. However, pressures of about 3000 p. s. i. g. to 9000 p. s. i. g. effect substantially greater conversions, as is the experience with other hydrocarbon synthesis processes and catalysts. It is, therefore, largely a matter of economics whether high pressures or large recycle ratios are employed.

The alumina catalyst can be prepared by any one of several methods so long as the product contains less than 0.3% of alkali-metal oxide. It can be prepared as a gel-type alumina base by coagulating a gel from an aluminum sol solution, as taught in USP 2,432,286 and USP 2,481,824. A method of preparing a catalyst that is substantially free of alkali-metal oxide, that is, a catalyst that will contain, as a rule, less than about 0.05% alkali-metal oxide, has been described and claimed in USP 2,274,634 (Re. 22,196) and USP 2,371,237. According to these methods, the pure alumina is prepared by treating, with water or dilute acid, amalgamated aluminum metal, coagulating the so-formed stable alumina sol with a non-alkali-metal electrolyte, and drying the resultant gel. More specifically, the catalyst can be prepared by coagulating the stable alumina sol by the addition of ammonium hydroxide solution, drying the gel at 200° F., and finally heat-treating in air at 900° F. Catalyst prepared in this method was employed in the specific example hereinafter reported.

Figure 2:
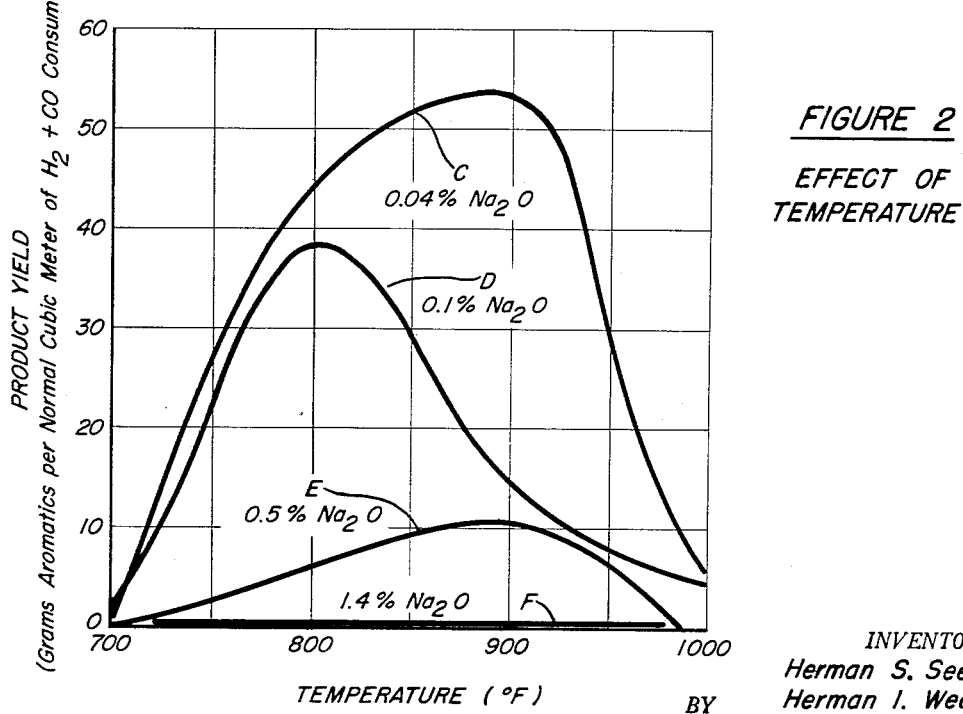

In the drawing, which is presented for the purpose of illustrating the present invention, Figure 1 is the representation of curves showing the effect of alkali-metal oxide concentration on the aromatic product yield at two different temperatures, and Figure 2 is a representation of curves showing the effect of temperature on the aromatic product yield at several alkali-metal-oxide concentrations.

Our process may be best described by the following example of the synthesis of aromatics from hydrogen and carbon monoxide over a pure alumina catalyst having the following analysis:

Table 1

| Component | Weight Percent, Dry Basis |
|---|---|
| $Al_2O_3$ | [1] 99.579 |
| $Na_2O$ | 0.040 |
| $Fe_2O_3$ | 0.094 |
| $SiO_2$ | 0.165 |
| $MgO$ | 0.040 |
| $CuO$ | 0.003 |
| $MnO_2$ | 0.005 |
| $MoO_3$ | 0.078 |

[1] By difference.

This alumina catalyst was prepared by amalgamating aluminum metal, peptizing the amalgam with 2% acetic acid at a temperature between about 140° and 160° F. to form a stable alumina sol, coagulating the alumina sol by adding ammonium hydroxide to a pH of above about 7, drying the resultant gel slowly in air at 185° F., and then calcining at 900° F. for 4 hours. The calcined catalyst retained a volatile content ($H_2O$) of 8.78 weight percent. The catalyst was ground to a particle size which would pass through a 5-mesh screen and be retained on a 14-mesh screen. This catalyst was employed in the conversion of a synthesis gas introduced into a pressure vessel in a mol ratio of 1:1 and at a space velocity of 500 volumes of gas per volume of catalyst per hour, and a pressure of 450 p. s. i. g. The catalyst was employed for 19 days in the synthesis of aromatics from the synthesis gas. Temperatures were increased throughout the operating period from 700° to 975° F., the optimum temperature being approximately 900° F. Substantially no aromatics were prepared at 700° F. At 800° F. a yield of 44.8 grams of liquid aromatics per normal cubic meter of hydrogen and carbon monoxide consumed was obtained but the carbon monoxide conversion was low, only 4.3%, owing not only to the relatively low temperature but to the low pressure employed for convenience in operating. It is preferable to employ pressures of about 3000 to 9000 p. s. i. g. to avoid the need for a high recycle and obtain higher carbon monoxide conversions per pass. Average conversions of about 15.9% were obtained at a temperature of 900° F. and 450 p. s. i. g. The conversion of carbon monoxide increased to about 19% at 975° F. but the yield of aromatics was much reduced.

Over two-thirds of the hydrocarbon products of the synthesis at 900° F. have a carbon number of 3 or greater, of which substantially all of the liquid product, about one-third of the total $C_3+$ yield, consisted of aromatic hydrocarbons. The refractive index of the liquid product obtained varied through the run from about 1.505 and 1.532, thus indicating, by its high value, the high aromaticity of the product.

The liquid hydrocarbon product from the synthesis run at 900° F. using the alumina catalyst containing 0.04 weight percent $Na_2O$ was percolated through a column of silica gel to separate the aromatics from the non-aromatic hydrocarbons. The liquid product was found to contain 96% aromatics, 1% olefins and 3% paraffins plus naphthenes. Traces of oxygenated compounds were present. The aromatic fraction from the percolation was combined with a comparable aromatic fraction from a duplicate run and was fractionally distilled. The fractions from the distillation were subjected to infra-red spectrographic analysis. The results of these examinations are shown in Table II.

Table II

| Fraction No. | Volume, Percent | Boiling Range, °C. | Composition [1] |
|---|---|---|---|
| 1 | 1.1 | 75–110 | Principally benzene. |
| 2 | 1.8 | 110–125 | Principally toluene. |
| 3 | 8.3 | 125–145 | Para-xylene; meta-xylene; trace ortho-xylene. |
| 4 | 6.8 | 145–168 | 1-methyl-2-ethylbenzene; 1-methyl-4-ethylbenzene; trace mesitylene and ortho-xylene. |
| 5 | 12.4 | 168–177 | Principally 1,2,4-trimethylbenzene; trace mesitylene. |
| 6 | 9.2 | 177–192 | 1,3-dimethyl-5-ethylbenzene; 1,3- and 1,4-dimethyl-2-ethylbenzene; 1,2,3- and 1,2,4-trimethylbenzene. |
| 7 | 11.2 | 192–200 | Principally durene and isodurene. |
| 8 | 22.4 | 200–232 | 1,2,3,4-tetramethylbenzene; other unidentified aromatics. |
| 9 | 7.9 | 232–237 | Pentamethylbenzene. |
| Bottoms | 18.9 | 237+ | 2-methylnaphthalene and other unidentified aromatics, principally polycyclic. |

[1] Determined by infrared spectrographic analysis.

The product is primarily polymethyl-substituted benzenes. It is apparent that the present process can produce relatively large quantities of aromatics that have not heretofore been commercially available.

The foregoing specific example and runs conducted at other temperatures and other concentrations of alkali-metal oxide on the catalyst provided the results demonstrated by the curves shown in the drawing. Referring specifically to Figure 1, isotherm A indicated thereon represents the alkali-metal oxide effect at 800° F., and shows that high product yields are obtained at alkali-metal oxide concentrations less than about 0.15. Isotherm B reflects the product yield obtained at 900° F., and shows that alkali concentrations on the catalysts of less than about 0.10 weight percent provide relatively high yields of liquid aromatic product. The sharp break in the curves at about 0.2 percent by weight of sodium oxide defines clearly the preferable limit of alkali concentration under the reaction conditions here employed and when sodium oxide is the alkali present.

Figure 2 illustrates the effect of temperature upon the yield of aromatics. As can be seen from curve C, which records the behavior of an alumina catalyst containing 0.04% of sodium oxide, a maximum yield of aromatic hydrocarbons was obtained at about 900° F., and that at a somewhat higher temperature approaching 1000° F. the yield dropped abruptly to less than 6 grams or about 48 grams less than the yield obtained at 900° F. The curve also shows that at temperatures as low as about 700° F. even catalyst with this low alkali concentration was unable to effect any substantial production of aromatic hydrocarbons.

Curve D shows that a maximum yield of about 38 grams is obtained with an alumina catalyst having about 0.1 weight percent of alkali thereon at temperatures at a lower point in the range claimed in the specification, i. e., 800° F., and that this yield decreases to substantially zero if the temperature is lowered to 700° F., and to 15 grams if the temperature is raised to 900° F.

Curve E shows that with a concentration upon the catalyst of 0.5 weight percent of sodium oxide no operating temperature will provide a yield of aromatics greater than about 10 grams per cubic meter of carbon monoxide and hydrogen consumed.

Curve F shows that a concentration of alumina catalyst of 1.4 weight percent sodium oxide provides substantially no yield of aromatic hydrocarbons within the temperature range employed.

Our process provides a useful method for the synthesis of aromatic hydrocarbons, particularly the methyl benzenes, directly from carbon monoxide and hydrogen.

Having described our invention, we claim:

1. A process for synthesis of aromatic hydrocarbons, the said process comprising: reacting carbon monoxide and hydrogen at a temperature between about 750° and 950° F., in the presence of an alumina catalyst that is substantially free of alkali-metal oxide and is prepared by treating an amalgamated aluminum metal with aciduous water to form a stable alumina sol, coagulating the alumina sol with a non-alkali-metal electrolyte, and drying the resultant gel; and recovering a normally liquid product of the said synthesis consisting predominantly of aromatic hydrocarbons.

2. A process for the synthesis of aromatic hydrocarbons which comprises effecting reaction of carbon monoxide with hydrogen at a temperature between about 750° F. and about 950° F. in the presence of a catalyst consisting essentially of alumina containing less than 0.3 weight percent of an alkali metal oxide, thereby producing a normally liquid product comprising predominantly aromatic hydrocarbons, and recovering said liquid product.

3. A process for the synthesis of aromatic hydrocarbons which comprises effecting reaction of carbon monoxide with hydrogen in a molar ratio between about 4:1 and 1:4 at a temperature between about 750° F. and about 950° F. and a pressure between about 30 and about 2000 atmospheres in the presence of alumina containing less than 0.2 weight percent of alkali metal oxide, thereby producing a normally liquid product consisting essentially of aromatic hydrocarbons, and recovering said liquid product.

4. A process for the synthesis of aromatic hydrocarbons which comprises passing carbon monoxide and hydrogen through a reaction zone at an hourly space velocity between about 100 and about 1500 at a temperature between about 750° F. and about 950° F. and a pressure between about 30 and about 600 atmospheres in contact with alumina containing less than about 0.3 weight percent of alkali metal oxide, thereby producing a liquid product consisting essentially of aromatic hydrocarbons, and recovering said liquid product.

5. A process for the synthesis of aromatic hydrocarbons which comprises passing carbon monoxide and hydrogen in a molar ratio between about 4:1 and 1:4 through a reaction zone at an hourly space velocity between about 100 and about 1500 at a temperature between about 800° F. and about 925° F. and a pressure between about 30 and about 2000 atmospheres in contact with a substantially pure alumina catalyst containing less than 0.2 weight percent of an alkali metal oxide, thereby producing a liquid product consisting substantially entirely of aromatic hydrocarbons, and recovering said liquid product.

References Cited in the file of this patent

UNITED STATES PATENTS 2,274,634     Heard _____ Mar. 3, 1942

OTHER REFERENCES

Storch et al.: "The Fischer-Tropsch and Related Synthesis," (Aug. 1951), John Wiley & Sons, Inc., New York, N. Y., pages 454 to 460.